Figures 1, 2:
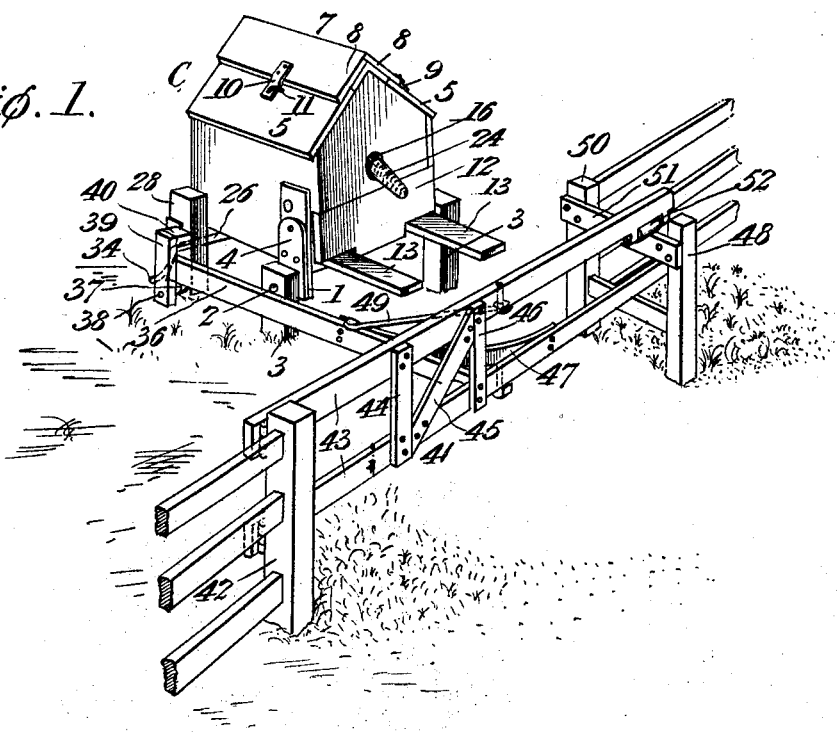

No. 756,416. PATENTED APR. 5, 1904.
A. F. W. SCHRÖDER.
SALT BOX FOR ANIMALS.
APPLICATION FILED SEPT. 30, 1903.
NO MODEL. 2 SHEETS—SHEET 1.

Witnesses

A. F. W. Schröder
Inventor
by C. A. Snow & Co.
Attorneys

No. 756,416. PATENTED APR. 5, 1904.
A. F. W. SCHRÖDER.
SALT BOX FOR ANIMALS.
APPLICATION FILED SEPT. 30, 1903.
NO MODEL. 2 SHEETS—SHEET 2.
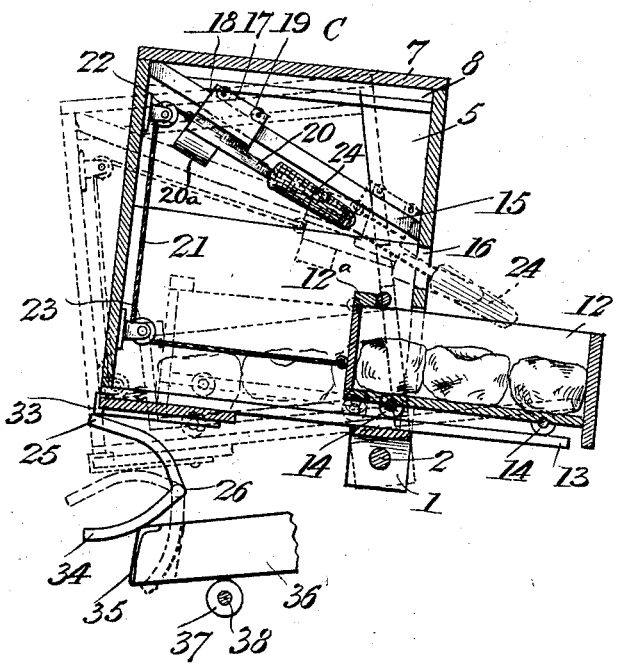
Fig. 3.
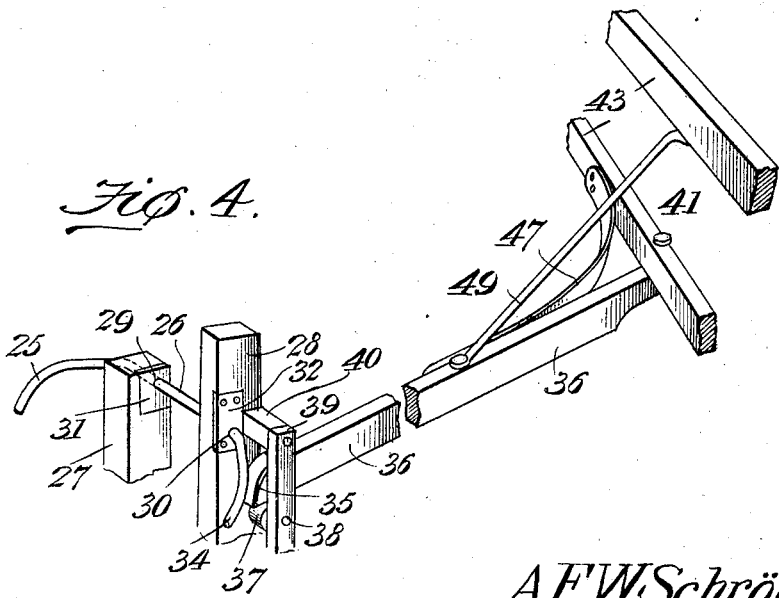
Fig. 4.
Fig. 5.
Witnesses
A. F. W. Schröder
Inventor
by C. A. Snow & Co.
Attorneys No. 756,416.

Patented April 5, 1904.

UNITED STATES PATENT OFFICE.

ANDREW F. W. SCHRÖDER, OF FONTANELLE, IOWA.

SALT-BOX FOR ANIMALS.

SPECIFICATION forming part of Letters Patent No. 756,416, dated April 5, 1904.

Application filed September 30, 1903. Serial No. 175,222. (No model.)

*To all whom it may concern:*

Be it known that I, ANDREW F. W. SCHRÖDER, a citizen of the United States, residing at Fontanelle, in the county of Adair and State of Iowa, have invented a new and useful Salt-Box for Animals, of which the following is a specification.

This invention relates to salt-boxes for animals; and the principal object of the invention is to provide an improved salt-box for animals in which the salt will be completely protected when an animal is not procuring salt therefrom, which will be easily operated by an animal to expose the salt, and which is designed to attract thereto animals that have not learned the utility of the salt-box.

A further object of the invention is generally to improve the construction of salt-boxes for animals by providing an improved form of mechanism for exposing the salt contained in the box, so that animals may easily obtain it from the box.

With the objects above stated in view the invention consists in the construction and combination of parts of a salt-box for animals hereinafter fully described, illustrated in the accompanying drawings, and having the novel features thereof particularly pointed out in the appended claims.

In the drawings, Figure 1 is a view in perspective of the complete invention with the parts in position to protect the salt from the weather. Fig. 2 is a view in side elevation, showing the parts in position to protect the salt as shown in Fig. 1. Fig. 3 is a vertical section through the housing and the salt-receptacle slidably mounted therein. Figs. 4 and 5 are detail views showing parts of the operating mechanism.

Referring to the drawings, in which corresponding parts are designated by similar characters of reference throughout, C designates a casing or housing provided at its forward end with downwardly-extending supporting-arms 1, through each of which extends a pin 2, which is secured in an upright post 3, driven in the ground and rising to a suitable height for the support of the salt-box. Each of the arms 1 is preferably provided on the outside with a protective covering 4 of sheet metal and is rigidly attached to the casing C in any suitable manner. The casing C is preferably rectangular in form and is provided at the top with a roof or cover comprising sloping sections 5, which are spaced apart at their upper edges, as shown, to leave an opening through which the arm may be introduced into the casing when desired. This opening is normally closed by means of a hinged lid 7, consisting of two members 8, disposed substantially at right angles and rigidly secured together. The lid 7 is hinged, by means of hinges 9 of any suitable construction, to one of the roof-sections 6 and will ordinarily be provided with a hasp 10 to engage with a staple 11 on the roof of the casing to form a fastening means for the lid.

In the bottom of the casing there is arranged a drawer or receptacle 12, the front of which forms a part of the casing-wall and which is slidably supported within the casing. The drawer 12 is adapted for easy reciprocation into and out of the casing near the bottom of the casing and on forwardly-extending bars 13, which form a track. In order to insure ease of movement, the drawer 12 is provided on each side with a pair of small rolls or wheels 14, which rest normally upon the bottom of the casing and which will roll along the bars 13 when the drawer moves forward. The forward movement of the drawer is limited by the contact of the forwardly-projecting crosspiece $12^a$ on the drawer with a cross-rod in the casing.

Mounted in the upper portion of the casing over the drawer 12 is an inclined bar 15, the end of which terminates above a circular opening 16 in the front of the casing, and there is supported on the bar 15 a carrier 17, comprising a frame 18, rolls 19, mounted in the frame and resting on the upper surface of the bar, and a pin or spike 20, counterbalanced by a weight $20^a$ at the rear and having its sharpened extremity normally protruded through the opening 16. To the rear end of the carrier 17 there is attached a cord or cable 21, which passes upward and rearward in the casing over a freely-rotatable roll 22 in the upper rear portion of the casing and thence downward under a similar roll 23 near the bottom of the rear wall of the casing, whence it passes forward to be attached to the rear end piece 12ᵃ of the drawer 12. The cord 21 is of such length that when the drawer 12 is pushed into the casing and the front end of the drawer forms a part of the front wall of the casing the carrier 17 will be at the lower end of the bar 15, with the forward end of the spike 20 protruded through the opening 16 in convenient position to support on its sharpened end an ear of corn, (indicated at 24 in Fig. 1;) but when the drawer is advanced, as shown in Fig. 3, the carrier 17 will be drawn upward and rearward along the bar 15, so as to retract the ear of corn within the casing.

The posts 3, upon which the forward portion of the casing is supported, will be arranged outside of a pasture-fence or within a small pen, the former arrangement being that illustrated in the drawings. The rear portion of the casing will rest normally upon an arm 25 at one end of a crank-rod 26, which is supported in a short post 27 and a taller post 28. The short post 27 will preferably be arranged beneath the casing and the taller post 28 arranged at one side thereof, as shown. The crank-rod 26 will be rotatably mounted in openings 29 and 30 in posts 27 and 28, respectively, and the friction of movement will be reduced by metal bearing-blocks 31 and 32, mounted on said posts. The end 25 of the crank-rod will be rounded, as shown, and will be disposed beneath a protector-plate 33, arranged at the rear of the casing on the under surface thereof. At the other end of the crank-rod 26 will be another curved arm 34, which is arranged substantially at right angles to the arm 25. The arm 34 of the crank-rod will lie in contact with a protective strip 35 of metal upon the rounded end of a plunger 36, which is supported upon a small roll 37, which is rotatably mounted on a pin 38, extending through a small post 39, driven in the ground adjacent to the post 28 and spaced therefrom to form a guideway for the plunger 36, which is prevented from escaping from the guideway by means of a block or cleat 40 at the upper end of the post 39. At its forward end the plunger 36 is pivotally attached to the swinging frame or gate 41, hinged at one end to a post 42 and consisting of a pair of horizontal arms 43, connected by suitable brace members 44, 45, and 46 or other equivalent means. The arms 43 are spaced apart and are arranged at such height that horses may easily extend their heads over the upper bars, while cattle will be able to insert their heads easily between the bars. A spring 47 is arranged in the angle between the plunger 36 and lower bar 43 and acts normally to force the gate forward until the free ends of the bars 43 lie in contact with a post 48. The plunger 36 is also connected with the gate by means of a brace-bar 49, pivotally attached to the plunger and to the upper arm 43. When an animal presses against either of the bars 43, the gate will be swung toward the casing, its movement being limited by a post 50 adjacent to the post 48 and a guide for the movement of the gate being provided by a bar 51, connecting the posts 48 and 50 near the top. The movement of the upper arm 43 over its bar is facilitated by an antifriction-roll 52, rotatably mounted on the under side of the upper bar 43 at its free end.

When the parts of the apparatus are in the position shown in Fig. 1, if an animal wishes to procure salt from the box he will approach the gate and press it toward the casing, bringing the parts into the position shown in Fig. 3. The movement of the gate toward the casing forces the rounded end of the plunger 36 against the arm 34 on the crank-rod 26 and turns the crank-rod in its bearings sufficiently to raise the arm 25 at the other end of the crank-rod until gravity will cause the drawer 12, in which the salt will be contained, to roll forward over the bottom of the casing and the bars 13 until the drawer has reached the limit of its forward movement, thus exposing the salt in such position that the animal may have easy excess thereto. As soon as the animal has obtained salt enough to satisfy it it will turn away from the gate, and the spring 47 will force the gate forward into contact with the post 48. The weight of the rear end of the casing will then cause it to descend, raising the bars 13 and causing the drawer 12 to move into the casing and leave the parts in the position shown in Fig. 1.

If the animals in the pasture are unaccustomed to the sight of a salt-box of this construction and would not otherwise be led to procure salt therefrom, the sight of the ear of corn 24, which is held in front of the casing when closed to protect the salt, will attract an animal, and upon approaching the gate and endeavoring to reach the ear of corn it will exert enough pressure upon the gate to tilt the casing and cause the advance of the drawer 12, with the simultaneous retraction of the carrier 17 and the ear of corn supported thereby. The corn having been withdrawn and the salt exposed in such position as to be easily accessible, the animal will naturally obtain from the box all the salt required, and the retraction of the corn before the animal has an opportunity to reach it will make it unnecessary to replace the corn except at long intervals.

To charge the apparatus with salt, the easiest mode of procedure will be to tilt the casing sufficiently to advance the drawer, so that the salt may be emptied directly from the bag or other container into the drawer, and the lid 7 will be opened only to afford access to the interior of the casing when it is desired to arrange the mechanism of the carrier 17 in case of its having become deranged in any way.

From the foregoing description and the drawings illustrative thereof it will have been noted that the salt-box is simple in construction and may easily be erected by any farmer having ordinary knack in the use of tools, that it may be operated by animals with very little effort, that the salt-box is so constructed that several animals may simultaneously obtain salt therefrom, and that it will thoroughly protect the salt when animals are not actually obtaining it from the salt-box and will therefore prevent waste almost entirely.

The arrangement of an ear of corn for a lure in order to attract animals unfamiliar with such structures is a special feature of the invention not found, so far as I am aware, in other salt-boxes for animals and is adapted to save much time and trouble in familiarizing animals with the apparatus. It will also insure the salting of animals to the degree necessary to keep them in the best condition, while with automatic salters not provided with some such device to attract the attention of animals thereto and cause them to operate the device the salt may never be touched.

While I have described and illustrated the preferred form of embodiment of the invention, it will be obvious that various changes may be made in the details of construction without in any way departing from the spirit of the invention or sacrificing its advantages, and hence I do not desire to be limited to the exact form and construction shown, but reserve the right to make such changes therein as lie within the scope of the appended claims.

Having thus described the construction and operation of my invention, what I claim as new, and desire to secure by Letters Patent, is—

1. A salt-box for animals comprising a tilting receptacle in which salt is normally concealed, a swinging gate, and connections between said gate and receptacle whereby movement of said gate toward the receptacle will tilt the receptacle and expose the salt contained therein.

2. A salt-box for animals comprising a tilting receptacle in which salt is normally concealed, a movable gate disposed in front of the receptacle, means to keep said gate normally advanced from said receptacle, and connections between said gate and receptacle whereby the movement of the gate toward the receptacle will tilt the receptacle and expose the salt concealed therein.

3. The combination with a receptacle having salt concealed therein of opening mechanism comprising a swinging gate disposed in front of said receptacle and a plunger attached to said gate and operatively connected with said receptacle to expose the salt contained therein when the gate is pressed toward the receptacle.

4. The combination with a receptacle having salt concealed therein, of a swinging gate disposed in front of said receptacle, a plunger pivotally connected with said gate, and a crank-shaft rocked by said plunger to open said receptacle and expose the salt contained therein.

5. The combination with a receptacle having salt concealed therein, of a movable gate disposed in front of said receptacle, a plunger pivotally connected with said gate, a spring arranged between said plunger and said gate to keep the gate normally advanced, and mechanism disposed between the end of the plunger and the receptacle to open the receptacle and expose the salt contained therein when the gate is pressed toward the receptacle.

6. The combination with a casing, of a sliding drawer arranged within said casing and mechanism comprising a member pivoted in front of said casing to advance the sliding drawer when said member is pressed toward the casing.

7. The combination with a casing, of tracks extending from the front thereof, a sliding drawer within the casing and movable along said tracks, and mechanism operable by an animal to advance the drawer upon the tracks.

8. The combination with a tilting casing, of a drawer within the casing and freely slidable therein and mechanism operable by an animal to tilt the casing and project the drawer therefrom.

9. The combination with a tilting casing, of a drawer freely slidable therein, a crank-shaft having an arm disposed beneath one end of the casing, and mechanism operable by an animal to turn the crank-shaft and tilt the casing to cause the projection of the drawer therefrom.

10. The combination with a tilting casing of a drawer freely slidable therein and a carrier also slidable therein, the drawer being normally retracted and the carrier advanced, and connections between said drawer and said carrier whereby the advance of the one will always be associated with the retraction of the other.

11. The combination of a casing having an opening in the front, of a carrier having one end normally protruded through said opening, means operable by an animal to expose the salt contained in the casing, and means to retract the carrier as the salt is exposed.

12. The combination with a salt-box for animals, of a retractable member normally projecting from the box to support food for animals.

13. The combination with a salt-box for animals of means for supporting food for animals in front of the salt-box and means operable by the approach of an animal to the box, to retract said supporting means.

14. The combination with a tilting casing, of a salt-box slidable therein, a guide-bar arranged obliquely in said casing and having its lower end disposed at the front of the casing, a carrier arranged for travel on said guide-bar and having one end normally protruded beyond the casing-wall, connections between said carrier and said drawer whereby the advance of the drawer will retract the carrier, and means for tilting said casing to advance the drawer.

In testimony that I claim the foregoing as my own I have hereto affixed my signature in the presence of two witnesses.

ANDREW F. W. SCHRÖDER.

Witnesses:
C. B. SCOTT,
M. WISSLER.